United States Patent
Takenaka

(10) Patent No.: US 10,033,183 B2
(45) Date of Patent: Jul. 24, 2018

(54) SYSTEM AND METHOD FOR DETERMINING COST OF WEBSITE PERFORMANCE

(71) Applicant: KYOCERA CORPORATION, Kyoto (JP)

(72) Inventor: Tetsuya Takenaka, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 605 days.

(21) Appl. No.: 14/424,810

(22) PCT Filed: Aug. 29, 2013

(86) PCT No.: PCT/JP2013/005112
§ 371 (c)(1),
(2) Date: Feb. 27, 2015

(87) PCT Pub. No.: WO2014/034121
PCT Pub. Date: Mar. 6, 2014

(65) Prior Publication Data
US 2015/0236504 A1     Aug. 20, 2015

(30) Foreign Application Priority Data

Aug. 29, 2012  (JP) .................. 2012-189299

(51) Int. Cl.
*H02J 1/00* (2006.01)
*H02J 3/00* (2006.01)
(Continued)

(52) U.S. Cl.
CPC .................. *H02J 1/02* (2013.01); *H02J 7/35* (2013.01); *H02M 7/44* (2013.01); *Y10T 307/50* (2015.04);
(Continued)

(58) Field of Classification Search
CPC ............... H02M 1/126; H02M 3/1584; H02M 2001/123
(Continued)

(56) References Cited

U.S. PATENT DOCUMENTS 8,138,631 B2 *  3/2012  Allen ...................... H02J 1/10
                                                        307/82
2006/0049890 A1  3/2006  Wasaki et al.
(Continued)

FOREIGN PATENT DOCUMENTS

JP    2001-298952 A    10/2001
JP    2001-312319 A    11/2001
(Continued)

OTHER PUBLICATIONS

Extended European Search Report dated Jan. 21, 2016 issued by European Patent Office for Counterpart European Application No. EP 13833822.3.
(Continued)

*Primary Examiner* — Rexford Barnie
*Assistant Examiner* — Toan Vu
(74) *Attorney, Agent, or Firm* — Procopio Cory Hargreaves and Savitch LLP

(57) ABSTRACT

Diffraction of a noise may be reduced in an inexpensive manner without reducing power generation efficiency. A power generation control apparatus (10) includes a plurality of combinations of DC input terminals (101) and (102) for inputting DC power and a noise filter (11) connected to the DC input terminals (101) and (102), wherein each of the plurality of combinations has a different extreme value of frequency characteristics of the noise filter (11).

6 Claims, 4 Drawing Sheets

(51) Int. Cl.
*H02J 1/02* (2006.01)
*H02J 7/35* (2006.01)
*H02M 7/44* (2006.01)

(52) U.S. Cl.
CPC ........ *Y10T 307/685* (2015.04); *Y10T 307/707* (2015.04)

(58) Field of Classification Search
USPC .......................................................... 307/77
See application file for complete search history.

(56) References Cited

U.S. PATENT DOCUMENTS

2012/0087675 A1* 4/2012 Peng ................. H04B 10/2581
398/142
2013/0169380 A1 7/2013 Tamaki

FOREIGN PATENT DOCUMENTS

| JP | 2003-018849 A | | 1/2003 |
|----|----|----|----|
| JP | 2003018849 | * | 1/2003 |
| JP | 2006-187140 A | | 7/2006 |
| JP | WO2012090242 | * | 12/2010 |
| WO | 2012-039119 A1 | | 3/2012 |
| WO | 2012/090242 A1 | | 7/2012 |

OTHER PUBLICATIONS

International Search Report; PCT/JP2013/005112; dated Oct. 29, 2013.
Written Opinion of the International Searching Authority; PCT/JP2013/005112; dated Oct. 29, 2013; with concise explanation.

* cited by examiner

US 10,033,183 B2

SYSTEM AND METHOD FOR DETERMINING COST OF WEBSITE PERFORMANCE

CROSS REFERENCE TO RELATED APPLICATION

This application claims priority to and the benefit of Japanese Patent Application No. 2012-189299 filed on Aug. 29, 2012, the entire contents of which are incorporated herein by reference.

TECHNICAL FIELD

The present invention relates to a power generation control apparatus connected to a DC power source and also to a power supply system that includes the power generation control apparatus.

BACKGROUND ART

There are various installation modes of a solar cell module on a roof, depending on a shape, an area, a direction of the roof and the like. A variety of combinations may be considered; for example, a first solar cell string configured by directly connecting the a-number of modules on an east side, a second solar cell string configured by directly connecting the b-number of modules on a south side, and a third solar cell string configured by directly connecting the c-number of modules on a west side. An output of each of the solar cell strings differs based on the number of solar cell modules and a direction of the sun. There is known a solar power generation system that, in order to uniform voltages input from the solar cell strings, includes a boosting unit (a DC/DC converter) at an input end of an inverter (for example, see Patent Document 1).

RELATED ART DOCUMENT

Patent Document

Patent Document 1: Japanese Patent Application Laid-Open Publication No. 2001-312319

SUMMARY OF INVENTION

Technical Problem

When a plurality of DC power sources such as the solar cell strings are connected to a power conditioner, in order to increase an output voltage of each of the DC power sources, it is necessary to provide the DC/DC converters as many as the DC power sources. Since the DC/DC converter carries out switching control, an increase in the number of DC/DC converters is accompanied by an increase in the number of sources of noise. When each capacitor of each common mode noise filter has uniform capacitance value, due to frequency characteristics of the capacitors, the noise in a certain frequency band is increased.

As such, in order to prevent diffraction of the noise, it may be considered to insulate each input terminal of the power conditioner by using an isolation transformer. However, there is a problem that adding the isolation transformer increases cost and reduces power generation efficiency.

Accordingly, an object of the present invention in view of the above problem is to provide a power generation control apparatus that is inexpensive and capable of reducing the diffraction of the noise without reducing the power generation efficiency, and also to provide a power supply system.

Solution to Problem

In order to solve the above problem, a power generation control apparatus according to the present invention includes:
  a plurality of combinations of
  a DC input terminal for inputting DC power; and
  a noise filter connected to the DC input terminal, wherein each of the plurality of combinations has a different extreme value of frequency characteristics of the noise filter.
  Also, the power generation control apparatus according to the present invention, wherein
  the noise filter includes a common mode noise filter using a capacitor, and
  each of the plurality of combinations has a different capacitance value of the capacitor.
  Also, the power generation apparatus according to the present invention, wherein
  a power source of DC power input to each of the DC input terminals is a solar cell string including solar cell modules connected in series.
  Also, the power generation apparatus according to the present invention, wherein
  each of the solar cell strings has a different number of series connections.
  The power generation control apparatus according to the present invention further includes, for each of the plurality of combinations, a DC/DC converter for converting an output voltage of the noise filter into a predetermined voltage.
  In order to solve the above problem, further, a power supply system according to the present invention includes:
  the power generation control apparatus described above; and
  an inverter for converting DC power output from the DC/DC converter into AC power.

Effect of the Invention

According to the present invention, diffraction of a noise may be reduced in an inexpensive manner without reducing power generation efficiency.

DESCRIPTION OF EMBODIMENT

Hereinafter, one embodiment of the present invention will be described in detail with reference to the accompanying drawings.

Figure 1:
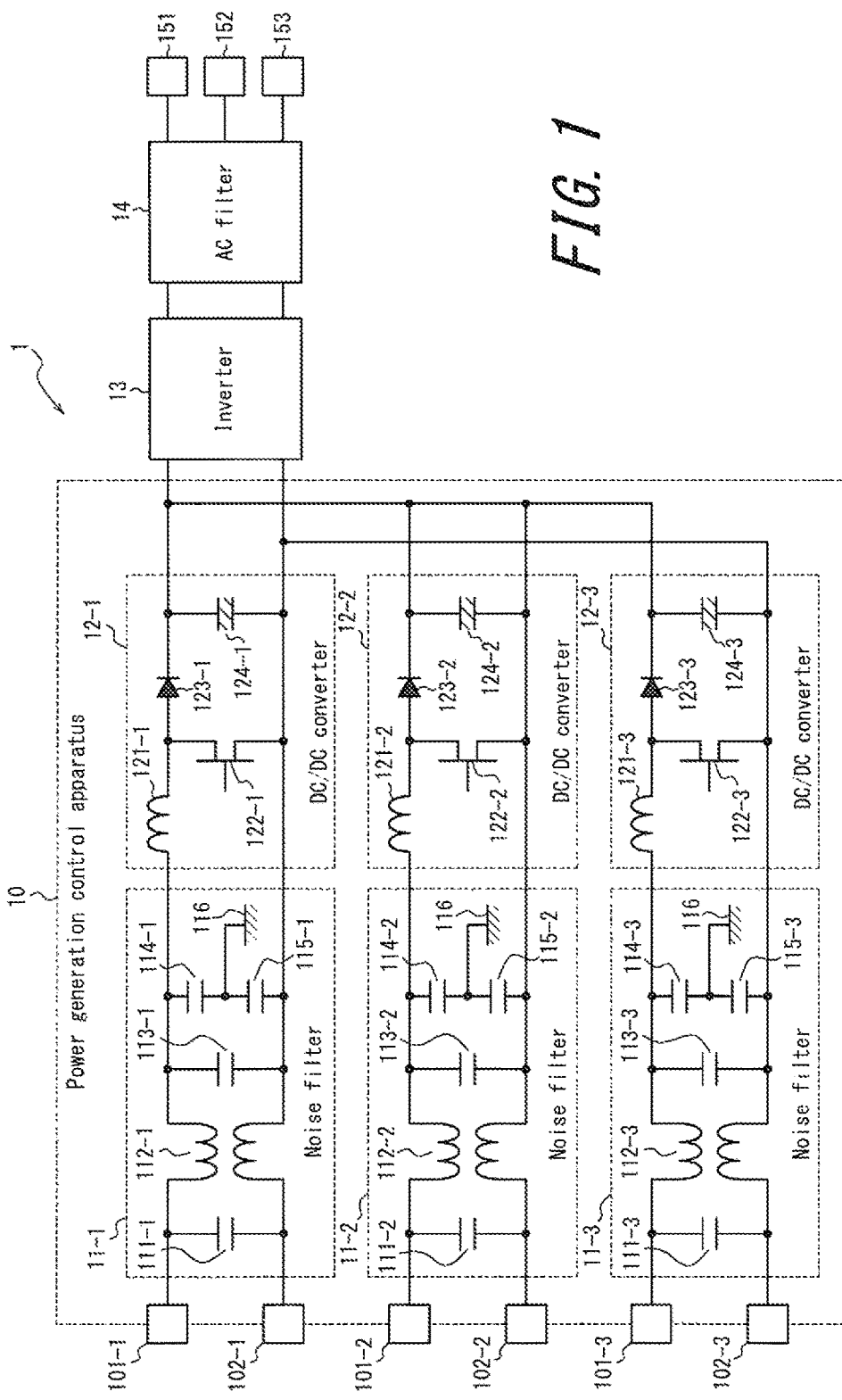
FIG. 1 is a block diagram illustrating an example of a configuration of a power supply system (a power conditioner) according to one embodiment of the present invention.

FIG. 1 is a block diagram illustrating an example of a configuration of a power supply system (a power conditioner) according to one embodiment of the present invention. As illustrated in FIG. 1, a power conditioner 1 includes a power generation control apparatus 10, an inverter 13, and an AC filter 14. Although FIG. 1 illustrates the power conditioner 1 connected to three DC power sources, the number of DC power sources connected to the power conditioner of the present invention is not restrictive thereto.

The power generation control apparatus 10 includes DC input terminals 101 (101-1, 101-2, and 101-3) on a positive side, DC input terminals 102 (102-1, 102-2, and 102-3) on a negative side, a plurality of noise filters 11 (11-1, 11-2, and 11-3), and DC-DC converters 12 (12-1, 12-2, and 12-3) as many as the noise filter 11. Note that the power generation apparatus 10 may omit the DC/DC converter 12.

Each of the DC input terminals 101 and 102 is connected to a DC power source. The DC power source is a solar cell string including, for example, a plurality of solar cell modules connected in series that convert the sunlight into DC power.

The noise filters 11 include a common mode noise filter and a normal mode noise filter and are designed to remove noise inside and outside thereof. FIG. 1 illustrates a circuit diagram of a typical noise filter, and the noise filters 11 include capacitors 111 (111-1, 111-2, and 111-3), line filters 112 (112-1, 112-2, and 112-3), capacitors 113 (113-1, 113-2, and 113-3), capacitors 114 (114-1, 114-2, and 114-3), and capacitors 115 (115-1, 115-2, and 115-3). Although the noise filters 11 according to the present embodiment form one stage, the noise filters 11 may form a plurality of stages.

The capacitors 111 and the capacitors 113 are across-the-line capacitors for removing a normal mode noise.

The line filters 112 are common mode choke coils for removing a common mode noise.

The capacitors 114 and the capacitors 115 are line bypass capacitors for removing the common mode noise. A contact point of the capacitors 114 and the capacitors 115 is connected to a frame ground (hereinafter, referred to as FG) 116 in a sharing manner.

The DC/DC converters 12 (12-1, 12-2, and 12-3) increase voltages input from the noise filters 11 to uniform voltages. FIG. 1 illustrates the circuit diagram of the DC/DC converters 12 commonly used including inductors 121 (121-1, 121-2, and 121-3) for generating induced electromotive force in a self-induction manner, FETs 122 (122-1, 122-2, and 122-3) for carrying out switching control, diodes 123 (123-1, 123-2, and 123-3) for preventing a reverse flow of a current, and capacitors 124 (124-1, 124-2, and 124-3) for smoothing the voltage.

A control unit (not illustrated) controls a duty ratio of a gate signal of the FET 122, whereby the DC/DC converter 12 controls an output voltage.

The inverter 13 converts the DC power at the voltage increased by the DC/DC converter 12 into AC power at a standard voltage. The standard voltage is, for example, an AC voltage of a commercial power supply system. In Japan, the AC voltage of the commercial power supply system has an effective value of 100 V and a frequency at 50 Hz or 60 Hz.

Figure 2:
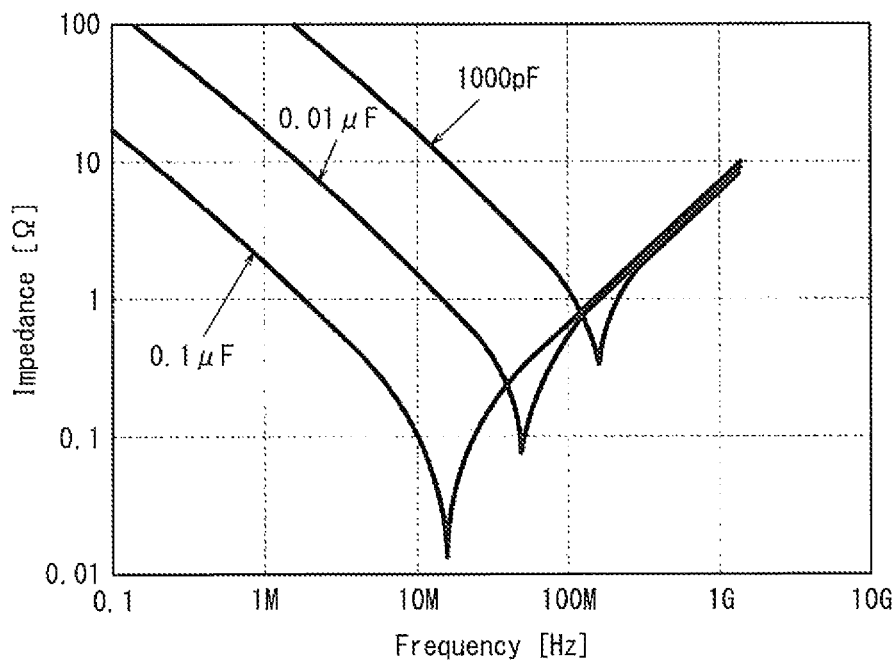
FIG. 2 is a graph illustrating frequency characteristics of a capacitor.

The AC filter 14 removes harmonics of the AC voltage input from the inverter 13 and is connected to the commercial power supply system via AC output terminals 151, 152, and 153. Note that a single-phase three-wire system includes three AC output terminals, while a single-phase two-wire system includes two AC output terminals Next, frequency characteristics of the capacitor will be described. FIG. 2 is a graph illustrating the frequency characteristics of the capacitor. In a capacitor, ideally, impedance decreases in inverse proportion to the frequency. However, the capacitor actually has characteristics that, due to an L/R component therein, the impedance takes a minimum value in a specific frequency band. FIG. 2 illustrates the frequency characteristics of capacitors having capacitance values of 1000 pF, 0.01 µF, and 0.1 µF, respectively. Utilizing such frequency characteristics of the capacitor allows a reduction in a noise in the frequency band in which the impedance of the capacitor takes the minimum value.

Figure 3:
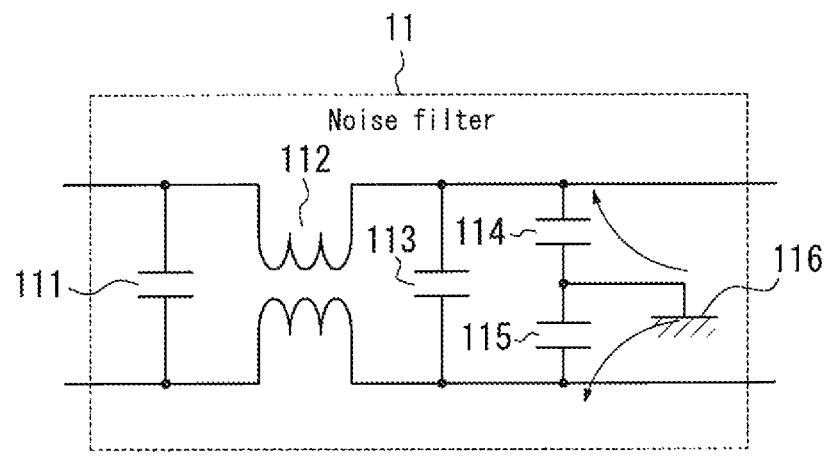
FIG. 3 is a diagram illustrating interfusion of a noise from a frame ground connected to a noise filter.

FIG. 3 is a diagram illustrating interfusion of a noise from the FG 116 connected to the noise filter 11. In the power conditioner 1, because of the switching operation of the DC/DC converter 12 and the inverter 13, there are a number of noises on the FG 116. These noises tend to flow outward through a path with the lowest impedance. Originally, the capacitors 114 and 115 are responsible for reducing the noise by making the noise bypass to the FG116. Conversely, however, when there are noises on the FG 116, noise in the frequency band in which the impedance of the capacitor becomes low is picked up via the capacitors 114 and 115 connected to the FG 116 as illustrated in FIG. 3, rather deteriorating noise characteristics in this frequency band.

When the power conditioner 1 is a non-isolated type, since the DC input terminals 102-1, 102-2, and 102-3 on the negative side are connected, the noise entering the FG 116 are diffracted to all of the DC input terminals 101 and 102. Note that, without the capacitors 114 and 115, the common mode noise in the frequency band that should originally be removed may not be reduced. Therefore, the capacitors 114 and 115 may not be omitted.

A conventional power conditioner includes the noise filters having uniform invariables. In this case, for the reasons described above, the noise in the frequency band in which the impedance of the capacitor takes the minimum value is picked up. Since the number of the sources of the noise increases in proportion to the number of the DC/DC converters 12, when the power conditioner includes a plurality of DC/DC converters 12, a standard value of the noise of an electromagnetic interference test may not be satisfied.

According to the present invention, therefore, each of the noise filters 11 is designed to have a different extreme value of the frequency characteristics. For example, among the noise filters 11, the capacitors 114 and 115 have different capacitance values on a JIS standard. However, when the capacitance values of the capacitors are greatly different from one another among the noise filters 11, the characteristics of the noise filters 11 become greatly different as well, possibly causing, as a result, an increase in the noise in the frequency band originally staying equal to or under the standard value to a value exceeding the standard value. Accordingly, the capacitance values are preferably determined to be, for example, values adjacent to one another at intervals of at least E24 series of the JIS standard in association with designed capacitance values.

According to the present embodiment, the capacitance values of the capacitors 114-1 and 115-1 are 1000 pF, the capacitance values of the capacitors 114-2 and 115-2 are 2200 pF, and the capacitance values of the capacitors 114-3 and 115-3 are 4700 pF.

Figure 4:
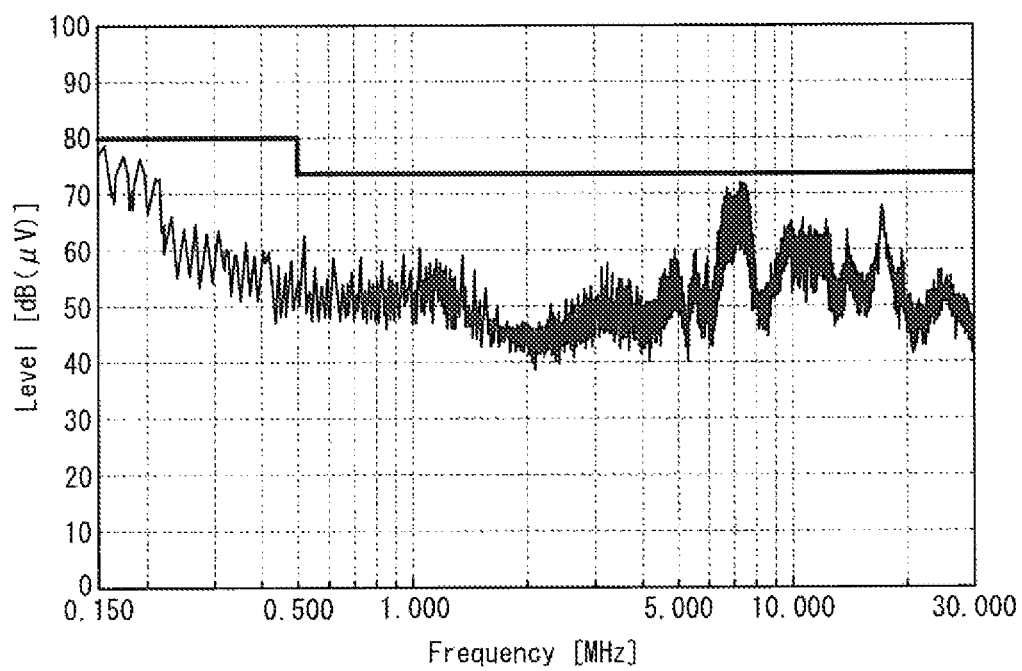
FIG. 4 is a graph illustrating an example of a result of a measurement of the noise at a DC input terminal of the power supply system according to one embodiment of the present invention.
Figure 5:
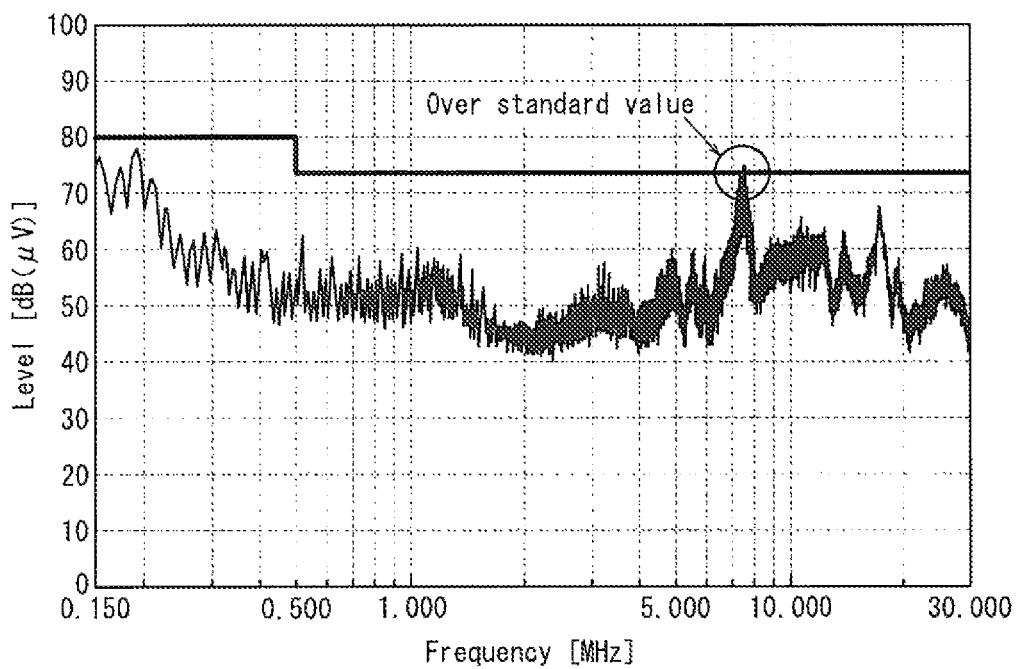
FIG. 5 is a graph illustrating an example of a result of a measurement of the noise at a DC input terminal of a power conditioner when noise filters have uniform invariables.

FIG. 4 is a graph illustrating an example of a result of a measurement of the noise at the DC input terminal 101 or 102 of the power conditioner according to the present embodiment. FIG. 5 is a graph illustrating an example of a result of a measurement of the noise at the DC input terminal 101 or 102 of the power conditioner when the noise filters 11 have uniform invariables. In these figures, a bold line indicates a standard value of the noise of the electromagnetic interference test. Note that, since the measurements of the noise at each of the DC input terminals 101-1 to 101-3 and 102-1 to 102-3 have approximately the same results, the result of the measurement of one of the terminals alone is illustrated in FIGS. 4 and 5.

FIG. 5 illustrates the result of the measurement of the noise at the DC input terminal 101 or 102 when the capacitance values of the capacitors 114 and 115 are 2200 pH. Although the noise at the DC input terminal needs to be equal to or lower than the standard value, the result of the measurement illustrated in FIG. 5 indicates sharp rising of the noise around 7 to 8 MHz with a peak value exceeding the standard value.

FIG. 4 illustrates the result of the measurement of the noise at the DC input terminals 101 or 102 when the capacitance values of the capacitors 114 and 115 are 1000 pF in the noise filter 11-1, 2200 pF in the noise filter 11-2, and 4700 pF in the noise filter 11-3. As can be seen in FIG. 4, since each of the noise filters 11 has a different frequency band in which the impedance of the capacitor takes the minimum value, the frequency band of the noise entering the FG 116 is dispersed and thus having the peak value under the standard value.

As described above, the power generation control apparatus 10 according to the present invention includes a plurality of combinations of the DC input terminals 101 and 102 for inputting the DC power and the noise filters 11 connected to the DC input terminals 101 and 102, and each of the noise filters 11 has a different invariable such that each of the plurality of combinations has a different extreme value of the frequency characteristics of the noise filter 11. For example, when the noise filters 11 include the common mode noise filter using the capacitors 114 and 115, each of the noise filters 11 has a different capacitance value of the capacitors 114 and 115. Thereby, each of the noise filters 11 has different frequency characteristics and, as a result, the frequency band of the noise generated becomes dispersed, reducing the peak value of the noise.

Although the above embodiment describes a typical example, it is appreciated that various modifications and substitutions may be implemented within the spirit and scope of the present invention by those who are ordinarily skilled in the art. Accordingly, the present invention should not be interpreted as restrictive to the embodiment described above, and various modifications and changes may be implemented without departing from the scope of the present invention.

For example, although in the above embodiment the DC power from the solar cell is input to the DC input terminals 101 and 102, DC power from a fuel cell or the like other than the solar cell may be input.

REFERENCE SIGNS LIST 1 power conditioner (power supply system)
10 power generation control apparatus
11 noise filter
12 DC/DC converter
13 inverter
14 AC filter
101, 102 DC input terminal
111, 113, 114, 115, 124 capacitor
112 line filter
116 frame ground
121 inductor
122 FET
123 diode
151, 152, 153 AC output terminal

The invention claimed is:

1. A power generation control apparatus comprising:
a first set of DC input terminals inputting first DC power;
a first noise filter connected to the first set of DC input terminals, the first noise filter having a first extreme value of frequency characteristics;
a second set of DC input terminals for inputting second DC power; and
a second noise filter connected to the second set of DC input terminals, the second noise filter having a second extreme value of frequency characteristics different from the first extreme value;
wherein the first extreme value of the first noise filter is different from the second extreme value of the second noise filter to disperse noise entering a frame ground from the first noise filter and the second noise filter.

2. The power generation control apparatus according to claim 1, wherein
the first noise filter includes a first common mode noise filter comprising a first capacitor having a first capacitance value, and
the second noise filter includes a second common mode noise filter comprising a second capacitor having a second capacitance value different from the first capacitance value.

3. The power generation control apparatus according to claim 1, wherein
the first DC power is input to the first DC input terminal from a first solar cell string including solar cell modules connected in series, and
the second DC power is input to the second DC input terminal from a second solar cell string including solar cell modules connected in series.

4. The power generation control apparatus according to claim 3, wherein
the first cell string has a first number of the solar cell modules, and
the second cell string has a second number of the solar cell modules different from the first number.

5. The power generation control apparatus according to claim 1, further comprising,
a first DC/DC converter converting a first output voltage of the first noise filter into a predetermined voltage; and
a second DC/DC converter converting a second output voltage of the second noise filter into the predetermined voltage.

6. A power supply system comprising:
the power generation control apparatus according to claim 5; and
an inverter converting DC power output from the first DC/DC converter and the second DC/DC converter into AC power.

* * * * *